United States Patent [19]

Asanuma et al.

[11] Patent Number: 4,772,661

[45] Date of Patent: Sep. 20, 1988

[54] PROCESS FOR THE PRODUCTION OF BLOCK COPOLYMER OF PROPYLENE

[75] Inventors: Tadashi Asanuma; Mitsuru Ito; Kaneo Ito; Shigeru Kimura; Nobutaka Uchikawa; Ichiro Fujio, all of Takaishi, Japan

[73] Assignee: Mitsui Toatsu Chemicals, Incorporated, Tokyo, Japan

[21] Appl. No.: 934,801

[22] Filed: Nov. 25, 1986

[30] Foreign Application Priority Data

Dec. 11, 1985 [JP] Japan ................................ 60-276693

[51] Int. Cl.$^4$ ........................................... C08F 297/08
[52] U.S. Cl. ........................................ 525/51; 525/53; 525/248; 525/249; 525/250; 525/323
[58] Field of Search ............................ 525/51, 53, 323

[56] References Cited

U.S. PATENT DOCUMENTS 4,454,299  6/1984  Schweier .............................. 525/323

FOREIGN PATENT DOCUMENTS 1081418  4/1986  Japan ................................. 525/323

Primary Examiner—Wilbert J. Briggs, Sr.
Attorney, Agent, or Firm—Oblon, Fisher, Spivak, McClelland & Maier

[57] ABSTRACT

A block copolymer of propylene is produced by using propylene itself as a liquid medium, conducting continuous polymerization (former-stage polymerization) of propylene alone or propylene and a small amount of ethylene at first and then conducting batchwise copolymerization (latter-stage polymerization) of ethylene and propylene. The amount of an activity improver to be added to a polymerization tank for the latter-stage polymerization and/or the polymerization time of the latter-stage polymerization are controlled in accordance with the amount of a slurry transferred from a polymerization tank for the former-stage polymerization to the polymerization tank for the latter-stage polymerization so as to maintain the ratio of the amount of the polymer polymerized by the former-stage polymerization to the amount of the polymer polymerized by the latter-stage polymerization constant in the block copolymer.

6 Claims, 6 Drawing Sheets

F I G.6
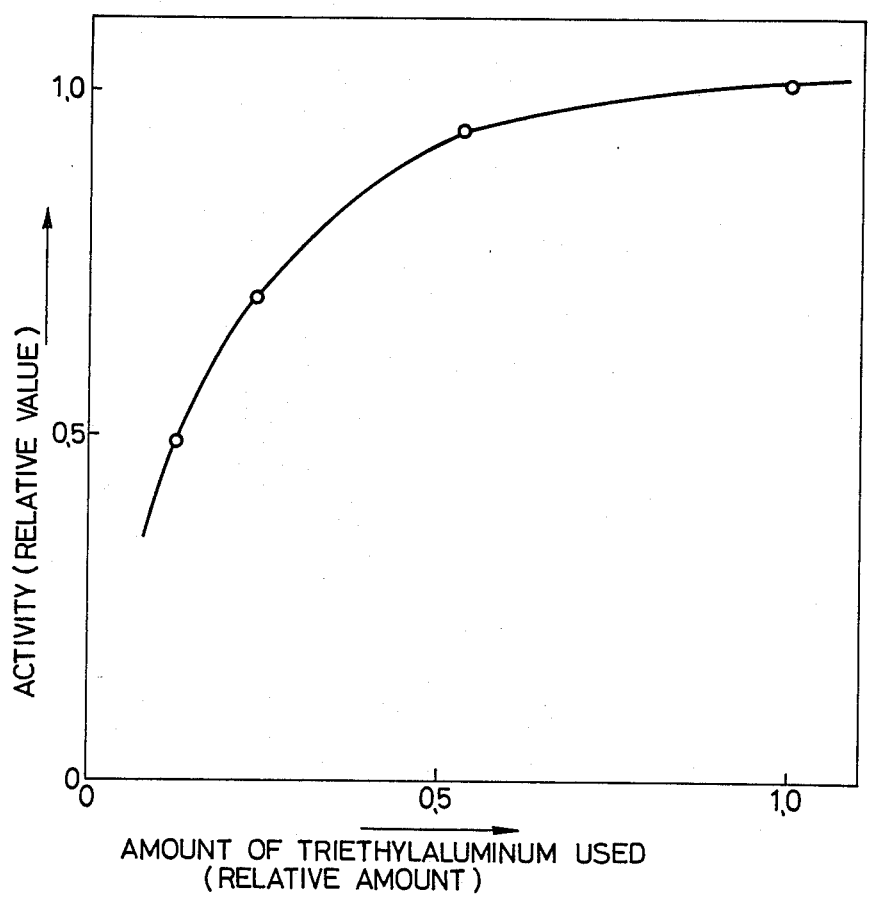

PROCESS FOR THE PRODUCTION OF BLOCK COPOLYMER OF PROPYLENE

BACKGROUND OF THE INVENTION (i) Field of the Invention

This invention relates to a process for the production of a block copolymer of propylene, and specifically to a process for the production of a propylene block copolymer of uniform quality by the combination of a particular polymerization process and a specific control method.

(ii) Description of the Prior Art

Many processes have already been well-known and proposed to produce block copolymers of propylene in order to improve the impact resistance of polypropylene, especially, its low-temperature impact resistance (see, for example, Japanese Patent Publication No. 20621/1969, Japanese Patent Publication No. 24593/1974, etc.).

In the meantime, as polymerization processes permitting multi-stage copolymerization of ethylene and propylene at different reacted ethylene/propylene weight ratios in relatively fewer polymerization tanks, the present inventors have also proposed to produce block copolymers by combining a continuous polymerization process and a batchwise polymerization process (see, for example, Japanese Patent Laid-Open No. 145114/1982, Japanese Patent Laid-Open No. 145115/1982, Japanese Patent Laid-Open No. 149319/1982, Japanese Patent Laid-Open No. 149320/1982, etc.).

The above-described processes featuring the use of a continuous polymerization process and a batchwise copolymerization process in combination are excellent processes which allow to produce block copolymers of various quality in a polymerization apparatus comprising fewer polymerization tanks connected together. They are however accompanied by a problem that fine quality control is difficult, because the amount of a slurry to be charged into each batch reaction tank and the concentration of the slurry do not remain constant due to differences in performance between catalysts of different lots, variations in quality of raw materials and/or the like in actual production on an industrial scale even when the polymerization apparatus is operated under constant conditions.

SUMMARY OF THE INVENTION

An object of this invention is to provide a process capable of producing a propylene block copolymer of less quality variations and excellent stiffness and impact resistance (especially at low temperatures) by combining continuous polymerization (former-stage polymerization) and batchwise polymerization (latter-stage polymerization).

The above object has been achieved by controlling the amount of an activity improver to be added in the latter-stage polymerization and/or the polymerization time of the latter-stage polymerization in such a manner that the ratio of the amount of the polymer polymerized by the former-stage polymerization to the amount of the polymer polymerized by the latter-stage polymerization is maintained constant in the block copolymer.

BRIEF DESCRIPTION OF THE DRAWINGS

FIG. 5 shows by way of example a polymerization apparatus suitable for use in the practice of the process of this invention (which is similar to the polymerization apparatus employed in the examples of Japanese Patent Laid-Open No. 149319/1982), in which:

A,B: Autoclave for continuous polymerization;
$C_1,C_2$ Autoclave for batchwise polymerization;
D: Autoclave for deactivating a catalyst;
E: Flash tank; and
F: Hopper; and FIG. 6 is a diagrammatic representation showing the relation between the activity of the catalyst employed in Example 1 and the amount of triethylaluminum used there.

DETAILED DESCRIPTION OF THE INVENTION

Figure 1:
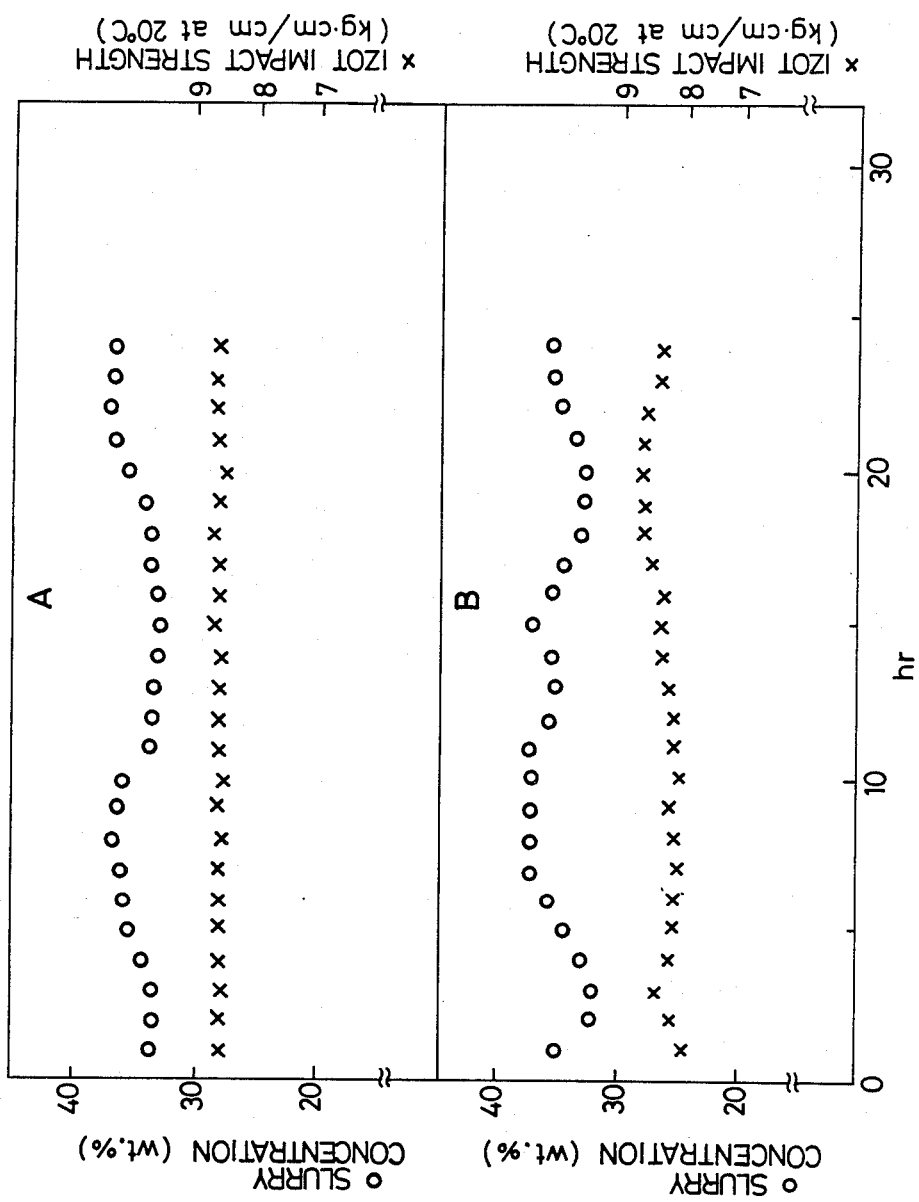
FIG. 1 is a diagrammatic representation showing the concentrations of slurries and Izod impact strength of copolymers obtained respectively in Example 1 (indicated by "A") and Comparative Example 1 (indicated by "B") as a function of time.

This invention relates to a process for the production of a block copolymer of propylene by using propylene itself as a liquid medium, conducting continuous polymerization (former-stage polymerization) of propylene alone or propylene and a small amount of ethylene at first and then conducting batchwise copolymerization (latter-stage polymerization) of ethylene and propylene, characterized in that the amount of an activity improver to be added to a polymerization tank for the latter-stage polymerization and/or the polymerization time of the latter-stage polymerization are controlled in accordance with the amount of a slurry transferred from a polymerization tank for the former-stage polymerization to the polymerization tank for the latter-stage polymerization so as to maintain the ratio of the amount of the polymer polymerized by the former-stage polymerization to the amount of the polymer polymerized by the latter-stage polymerization constant in the block copolymer.

In the present invention, the former-stage polymerization is effected by using propylene alone or by reacting ethylene and propylene at an ethylene/propylene weight ratio of 6/94 or smaller. In order to maintain good balance between the stiffness and impact resistance of the resulting block copolymer, it is preferable to control the weight ratio of the polymer polymerized by the former-stage polymerization and the polymer polymerized by the latter-stage polymerization at 60–95:40–5. Regarding conditions for the former-stage polymerization, it is only necessary to conduct it at polymerization temperature and pressure known to the public and employed routinely for propylene, namely, at room temperature to 90° C. and normal pressure to 50 kg/cm$^2$G. The polymerization may also be carried out by adding a molecular weight modifier such as hydrogen if necessary.

In the present invention, it is preferable to conduct the former-stage polymerization in two or more polymerization tanks in order to assure good physical properties, especially, fish eye resistance and falling ball impact resistance for the resulting polypropylene.

In this invention, the production of a block copolymer of propylene may be conducted by bulk polymerization in which propylene itself is used as a medium. No particular limitations are imposed on the polymerization temperature, the proportion of the polymer polymerized by the former-stage polymerization, the proportion of the polymer polymerized by the latter-stage polymerization and the weight ratio of ethylene and propylene to be reacted. The reaction temperature may preferably be 50°–90° C. in the former-stage polymerization and 30°–70° C. in the latter-stage polymerization. The polymer of propylene alone polymerized by the former-stage polymerization may preferably amount to 95–60 wt. % of the resulting copolymer. The former-stage polymerization may however be effected to contain ethylene and/or butene-1 or hexene-1 up to 6 wt. % in order to improve the transparency and gloss of the resulting copolymer. In the latter-stage polymerization, the reacted ethylene/propylene weight ratio may preferably range from 15/85 to 95/5. The ethylene and propylene may preferably be polymerized in such amounts that the polymer polymerized by the latter-stage polymerization amounts to 5–40 wt. % of the final copolymer. Use of propylene and ethylene in any amounts outside the above ratios is not preferred because the stiffness and impact resistance of the resulting block copolymer are not balanced well.

In the above-described process including continuous polymerization in the former stage and batchwise polymerization in the latter stage, the latter-stage is conducted usually in a relatively short period of time while dividing itself into a few stages in which ethylene and propylene are reacted at different ratios respectively. Therefore, the quality of the resulting polymer does not remain uniform unless the latter-stage polymerization is conducted responsive even to slightest variations in the continuous polymerization.

No particular limitations are imposed on the catalyst systems useful for the polymerization reactions in the present invention as apparent from the constitution of the invention. Conventionally-known catalysts may be employed. May be mentioned, for example, catalyst systems composed of catalysts of titanium trichloride and organoaluminum compounds or catalysts of carriers such as magnesium halides and titanium halides such as titanium chloride and titanium tetrachloride or alkoxy titanium supported thereon and organometallic compounds such as organoaluminums and organomagnesiums and modified in various ways.

The controlling method of the latter-stage polymerization which is important in the present invention will hereinafter be described in detail.

As principal parameters governing physical properties of a block copolymer, there are the following five parameters: (1-a) the proportion of homopolymerized propylene portion, (1-b) the molecular weight of the homopolymerized propylene portion, (2-a) the proportion of the copolymerized ethylene-propylene portion, (2-b) the reacted ethylene/propylene weight ratio in the copolymerized ethylene-propylene portion, and (2-c) the molecular weight of the copolymerized ethylene-propylene portion. In the present invention, the parameters (2-a), (2-b) and (2-c) are controlled to desired values.

What is important in the present invention is firstly to know the amount of a slurry transferred from a polymerization tank for the former-stage polymerization into a polymerization tank for the latter-stage polymerization. As an exemplary method for knowing the amount of this slurry, may be mentioned to know the quantity of heat generated in the former-stage polymerization. The concentration and amount of the slurry can then be determined from the quantity of the generated heat and the amount of charged propylene. On the other hand, the amount of the slurry transferred into the polymerization tank for the latter-stage polymerization may be known, for example, by provided a pressure-dependent level gauge with the polymerization tank for the latter-stage polymerization. Namely, the amount of the transferred polymer can be determined from the amount of the transferred slurry, which has been known by the pressure-dependent level gauge, and the above-mentioned concentration of the slurry. Based on the amount of the transferred polymer, it is possible to know the proportion of the polymer polymerized by the former-stage polymerization in the block copolymer.

In order to improve the controllability further, it is necessary to conduct the operation in such a way that the concentration of the slurry is maintained constant in the former-stage polymerization system.

The slurry concentration may be maintained constant in the following manner. Unlike solution polymerization, bulk polymerization does not permit use of the simple method in which polymerization is conducted at a constant pressure and the concentration of a slurry is calculated from the amount of an introduced solvent and the amount of introduced propylene. The concentration of a slurry can however be determined, for example, by detecting the quantity of generated heat accurately, determining the amount of polypropylene produced in the continuous polymerization system on the basis of the quantity of the generated heat and then calculating the ratio of the amount of the produced polypropylene to the amount of propylene charged in the continuous polymerization system. As an alternative, the concentration of a slurry can be determined directly by means of an orifice or in terms of transmittance of electromagnetic waves. The concentration of the slurry can be maintained constant by changing the amount of propylene to be charged. So long as the amount of the slurry delivered to the polymerization tank for the latter-stage polymerization is maintained constant, the above-described control of the slurry concentration assures automatically that the amount of the polymer introduced in the polymerization tank for the latter-stage polymerization is also maintained constant. Polymerization conditions are therefore maintained uniform and the controllability is also improved accordingly.

The amount of the transferred slurry may also be determined in the following manner. Namely, the slurry is transferred at a constant flow rate by using a pump or the like in addition to the pressure-dependent level gauge. The amount of the slurry is then determined as the product of the flow rate and the time required for the transfer of the slurry.

On the other hand, the amount of the polymer polymerized in the latter-stage polymerization system can be determined in terms of the quantity of heat generated there in the same manner as the amount of the polymer polymerized in the former-stage polymerization system. Specifically, it is given as a value obtained by dividing the quantity of the heat generated in the latter-stage polymerization with the quantity of heat generated per unit amount of the polymer, the latter quantity having been corrected by the reacted ethylene/propylene weight ratio. It may also be calculated in accordance with the amount of ethylene (or ethylene and propylene) required to maintain the pressure at a constant level at a constant temperature.

The amount of an activity improver to be added to a polymerization tank for the latter-stage polymerization and/or the polymerization time of the latter-stage polymerization are controlled so as to maintain the ratio of the amount of the polymer polymerized by the former-stage polymerization to the amount of the polymer polymerized by the latter-stage polymerization constant in the block copolymer. The amounts of the polymers can be determined by the above-described method. As the activity improver, an organometallic compound is preferred. More specifically, an organoaluminum, organomagnesium or organolithium may be mentioned by way of example.

The possibility of control of the catalytic activities through the adjustment of the amount of the added activity improver as described above can be understood from the fact that the relation between the weight ratio of an organoaluminum compound and titanium trichloride in a catalyst system and the activities of the catalyst system per unit weight of titanium trichloride is definite as disclosed, for example, in "Kinetics of Ziegler Natta Polymerization" by T. Keii (The Kodansha Publishing Co., Ltd.), page 23, FIGS. 2.7 and 2.22, and elsewhere and the activities of the catalyst system can be controlled by changing the amount of the organoaluminum compound to be added. Existence of a similar relation even in a catalyst with titanium tetrachloride supported on magnesium chloride is shown, for example, in Japanese Patent Laid-Open No. 149319/1982, FIG. 3. The amount of a polymerized polymer is a value obtained by integrating activities with respect to time. It is hence readily understood that the amount of the polymer to be polymerized by the latter-stage polymerization can be controlled by controlling the activities and/or reaction time.

According to another mode of control of the polymerization tank for the latter-stage polymerization in the present invention, the concentrations of propylene and ethylene in the liquid phase in the polymerization tank are determined by detecting the temperature and pressure in the polymerization tank. When the latter-stage polymerization is conducted while controlling the molecular weight of the resulting copolymer by using hydrogen as a molecular weight modifier, it is necessary to determine the concentration of hydrogen in the vapor phase and then to correct the pressure of the vapor phase and the concentrations of propylene and ethylene in the vapor phase.

Determination of the above-described temperature and pressure (and hydrogen concentration if necessary) allows to determine the propylene concentration, ethylene concentration and temperature in the liquid phase at any given time point in the latter-stage polymerization. It is therefore possible to determine the forming velocity of the resulting copolymer and the reacted ethylene/propylene weight ratio in the copolymer at any given time point, provided that there have been known in advance the relation between the propylene and ethylene concentrations in the liquid phase and the ethylene/propylene weight ratio in the copolymer, the relation between the propylene and ethylene concentrations in the liquid phase and the forming velocity of the copolymer as well as the relation between the temperature and the forming velocity of the copolymer.

It is therefore possible to know the amount of the ethylene-propylene copolymer produced and the weight ratio of ethylene to propylene reacted in the latter-stage polymerization system by integrating the above-described value with respect to time. By controlling the reaction time of the latter-stage polymerization or the amount of the activity improver to be added to the latter-stage polymerization in such a way that the above-described values reach desired values respectively, a propylene block copolymer of uniform quality can be produced.

The above-described relations will hereinafter be described specifically with reference to some of the accompanying drawings. FIG. 2 illustrates the relation between pressure and the mole concentration of ethylene in liquid, in which the pressure means the value obtained by subtracting the hydrogen pressure from the total pressure. It is envisaged that a linear relation exists between (the total pressure—the hydrogen pressure) and the concentration of ethylene in the liquid phase. Although the diagram shows data for 40° C., 50° C. and 60° C. only, the concentration of ethylene in a liquid phase can be immediately determined by knowing (the total pressure—the hydrogen pressure) and temperature, provided that the relation of FIG. 1 has been measured over a temperature range in which the temperature varies in the course of the polymerization reaction.

Figure 2:
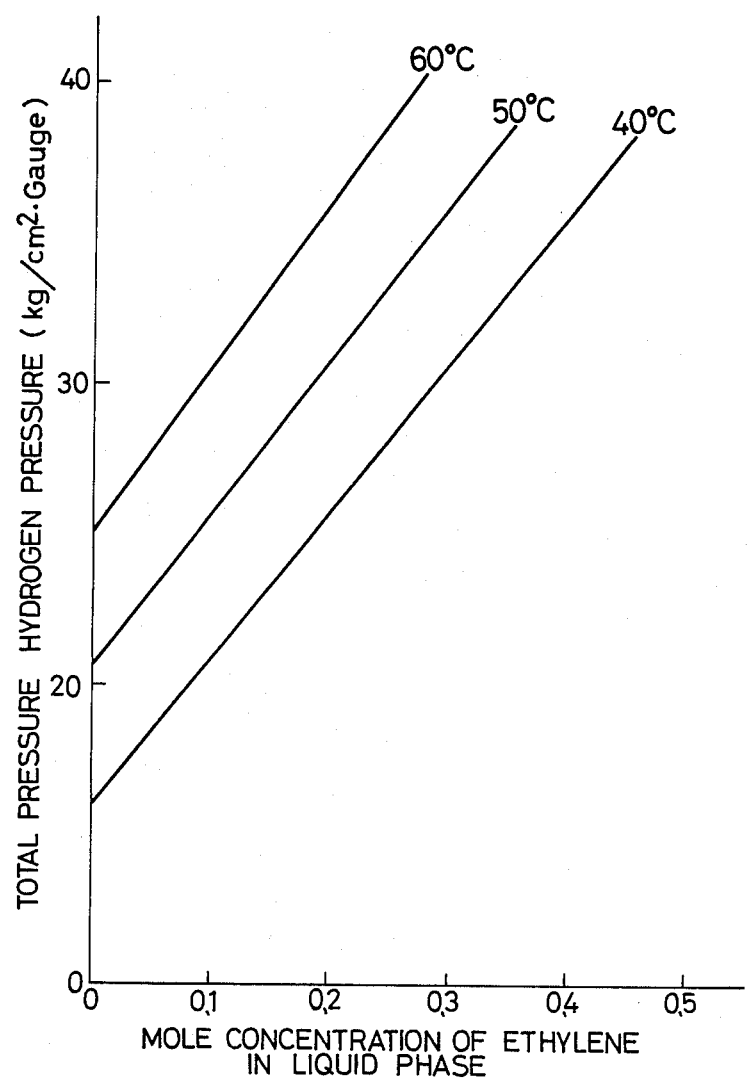
FIG. 2 is a diagrammatic representation illustrating the relation between (total pressure minus hydrogen pressure) and the concentration of ethylene in a liquid phase.
Figure 3:
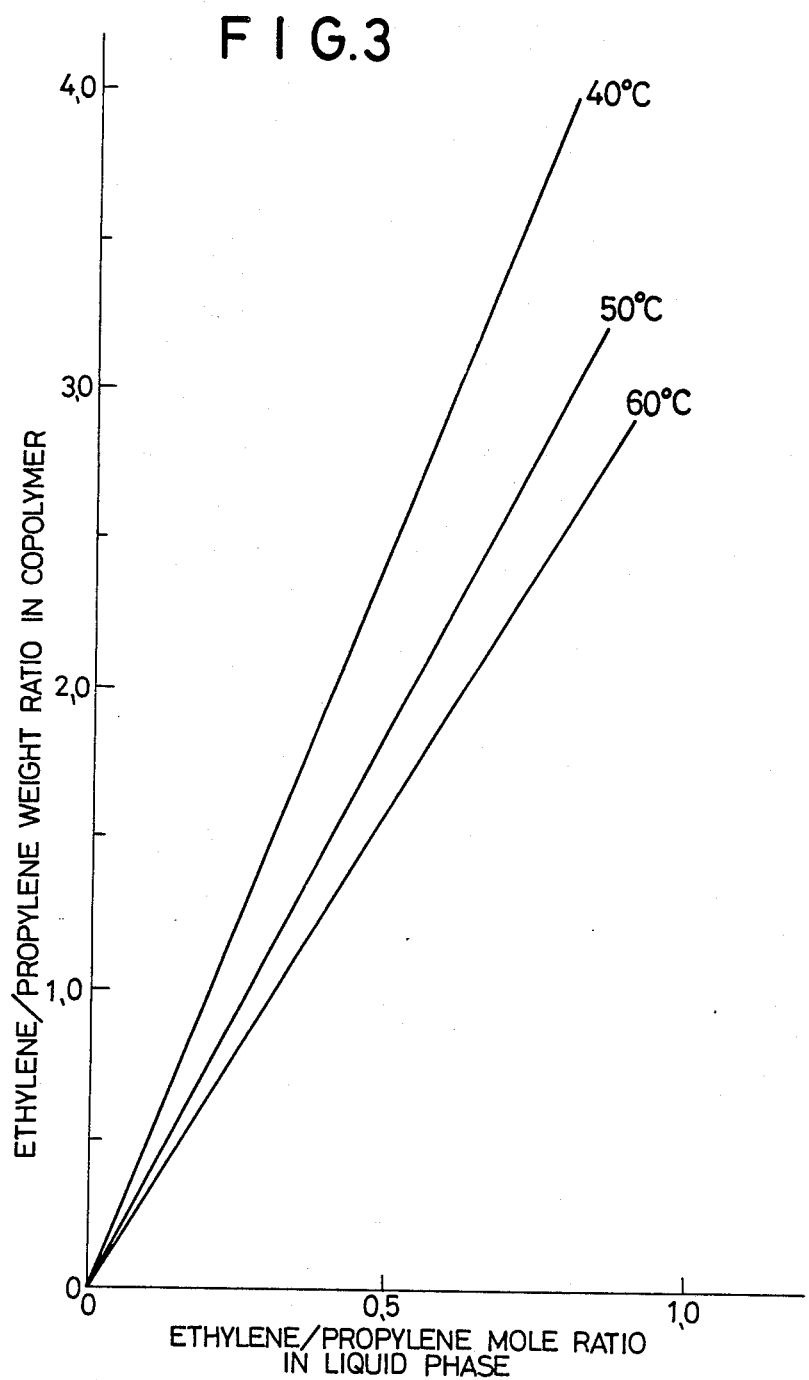
FIG. 3 is a diagrammatic representation showing the relation between the ethylene/propylene mole ratio in a liquid phase and the ethylene/propylene weight ratio in the corresponding copolymer.

FIG. 3 shows the relation between the ethylene/propylene weight ratio in the liquid phase and the reacted ethylene/propylene weight ratio in the resulting copolymer. This relation was obtained as a result of a polymerization reaction conducted by using a catalyst system obtained in accordance with the process disclosed in Example 1 of Japanese Patent Laid-Open No. 102606/1980, namely, a catalyst system making use of an activated titanium component, which has been obtained by grinding magnesium chloride, tetraethoxy silane and α,α,α-trichlorotoluene together and then bringing them into contact with titanium tetrachloride for their treatment, diethylaluminum chloride as an organoaluminum compound and ethyl benzoate as an electron-donative compound. The relation is linear within the range shown in FIG. 2. However, this relation is not necessarily required to be linear so long as a certain fixed relation exists. Although FIG. 2 shows results at 40° C., 50° C. and 60° C. only, it is only necessary to determine this relation over a necessary temperature range as described above.

On the other hand, an analysis of data obtained by changing the polymerization temperature by paying attention only to the polymerization activity of propylene in the copolymerization system has revealed that the polymerization activity of propylene is proportional to $e^{-\alpha/T}$, in which $\alpha$ is 6.32 for the above catalyst system and T means an absolute temperature. This relation is not necessarily required to satisfy the above-described relation. It is only necessary that their relation has been known.

Figure 4:
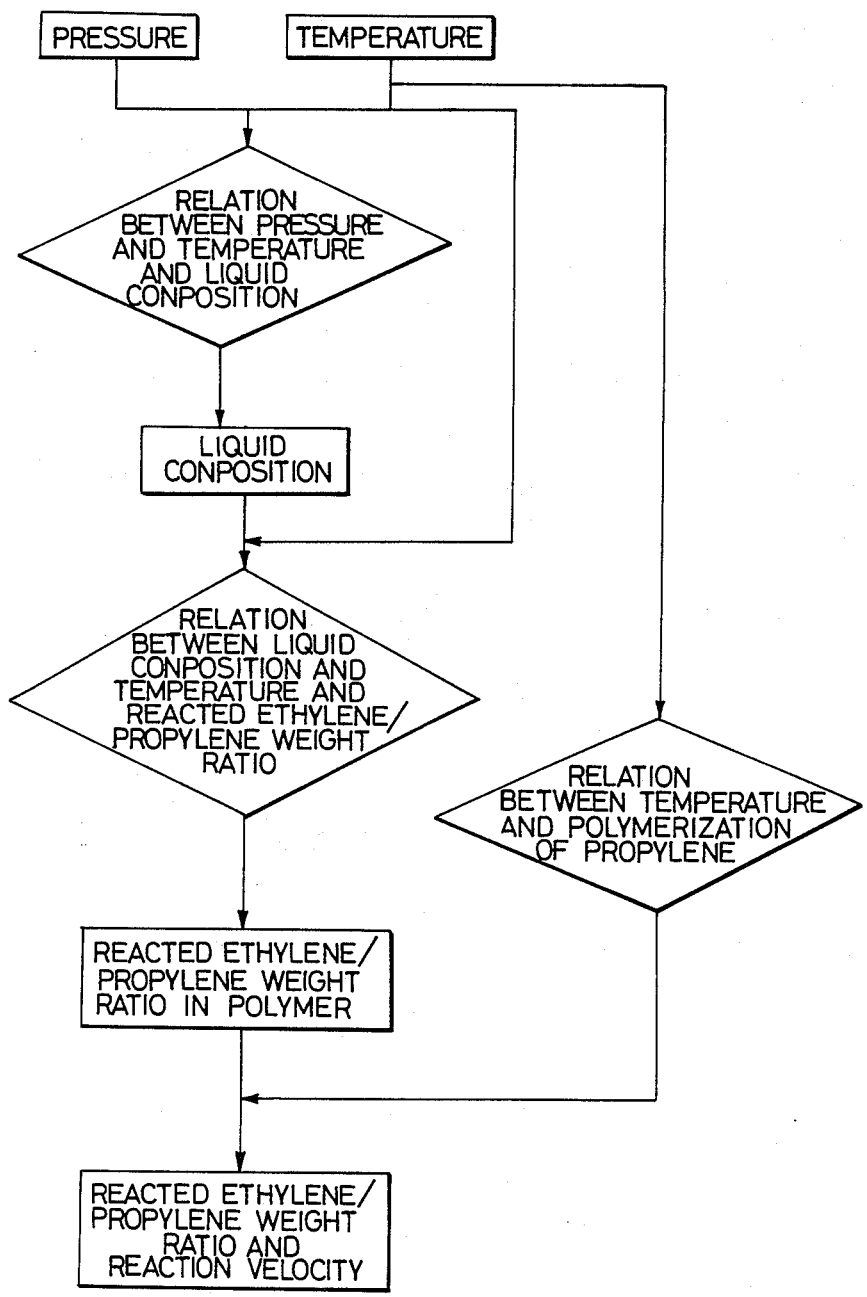
FIG. 4 is a flow sheet of operations in the polymerization process according to this invention.

It is therefore possible to determine the amount of the formed copolymer and the reacted ethylene/propylene weight ratio in the formed copolymer at any given time point in accordance with the flow sheet shown in FIG. 4.

The reacted ethylene/propylene weight ratio and the amount of the resultant copolymer can be determined at any time point in accordance with the flow sheet of FIG. 4. When the weight ratio is different from a desired value, it is possible to control the weight ratio to the desired value by changing the amount(s) of ethylene and/or propylene to be charged. Although the temperature is also one of parameters which can change the reacted ethylene/propylene weight ratio and the amount of the resultant copolymer, it is preferable to maintain the temperature constant by means of another control system since it is difficult to change the temperature in a short period of time.

When the amount of the resultant copolymer is different from a desired value, it is possible to change the reaction time so as to control the amount of the copolymer, which is obtained in the latter-stage polymerization and is contained in the block copolymer, to the desired value because the amount of the copolymer contained in the resultant block copolymer and obtained by the latter-stage polymerization is equal to the cumulative value of the amount of the resultant copolymer at a given time point. It is also possible to control the amount of the resulting copolymer to the desired value by pre-determining the relation between the added amount of the activity improver and the reaction velocity and then adding the activity improver in such an amount as to achieve the desired value. Here, it is preferable to control the amount of the resulting copolymer by varying the reaction time when there is only a small difference between the desired value and the amount of the resulting copolymer determined in accordance with the above-described flow chart, because the reaction velocity is correlated to the amount of the activity improver contained in the reaction tank and the activity can thus be accelerated by adding the activity improver but an addition of a deactivator is essential to lower the activity, thereby leading to increases to both kinds and amounts of reagents employed for the polymerization. It is hence preferable to achieve the above control by adding the activity improver only when the amount of the resulting polymer is considerably different from the desired value. An organometallic compound such as an organoaluminum may be used as the activity improver, whereas a compound capable of forming a complex with the organometallic compound such as an oxygen-containing compound or nitrogen-containing compound may be used as the deactivator.

FIG. 6 illustrates the relation between the activity (relative value) and the amount of triethylaluminum used (relative amount) when in the solid catalyst employed in Example 1, the proportion of triethylaluminum was only varied while maintaining the respective proportions of the solid catalyst, diethylaluminum chloride and methyl p-toluylate constant.

A further embodiment of this invention is to correct additionally the above-described control system in accordance with the content of ethylene in polypropylene, which content is calculated from the material balance of the polymerization system.

Namely, a comparison is made between the content of ethylene in the polypropylene, which content is calculated from the above-mentioned reacted ethylene/propylene weight ratio and amount of the resultant polymer both calculated on the basis of the temperature and pressure, and the ethylene content calculated from the material balance. The above-described calculation method for the reacted ethylene/propylene weight ratio and amount of the resultant polymer is then corrected in order to bring these values into conformity. Here, it is preferable to conduct the correction with respect to the amount of the resulting copolymer, because the relation between the pressure and the reacted ethylene/propylene weight ratio is not substantially changed by the amount and activity of the catalyst introduced in the latter-stage reaction tank but the amount of the catalyst introduced in the latter-stage polymerization tank (and the homopolymer of propylene obtained by the former-stage polymerization) and the catalytic activities vary by external causes such as differences in the activities of the catalyst among its lots.

This relation will hereinafter be described.

The reacted ethylene/propylene weight ratio $x(t)$ and the amount $y(t)$ of the resulting polymer at a given time point can be determined from the temperature and pressure in the latter-stage polymerization. Supposing that the amount of the polypropylene homopolymer introduced into the reaction tank for the latter-stage polymerization be $y_0$ and the reaction time of the latter-stage polymerization be $t_0$, $$\text{Total amount of the resulting block copolymer} = y_0 + \overset{t_0}{\Sigma} y(t)$$

Further, the ethylene content in the resulting block copolymer can be calculated by the following equation.

$$\text{Ethylene content in the resulting block copolymer} = \frac{\overset{t_0}{\Sigma} x(t) \cdot y(t)}{\text{Total amount of the resulting block copolymer}}$$

On the other hand, it is possible to determine, from the material balance, the amount $P_0$ of propylene and the amount $E_0$ of ethylene both introduced in the polymerization system and the amount $P_1$ of unreacted propylene and the amount $E_1$ of unreacted ethylene both discharged from the polymerization system. Therefore, the total amount of the resulting block copolymer is $(P_0-P_1)+(E_0-E_1)$. As a result, the ethylene content in the resulting block copolymer is also represented by the following equation:

$$\frac{E_0 - E_1}{(P_0 - P_1) + (E_0 - E_1)}$$

The two values of ethylene content calculated respectively in accordance with the above-described two equations are then compared with each other. If the ethylene content determined from the material balance is greater, the control is effected by increasing $y(t)$. If smaller, $y(t)$ is corrected to a smaller value to achieve the control.

The present invention will hereinafter be described further by the following Examples.

EXAMPLE 1

(i) Preparation of components of a solid catalyst

There was provided an oscillating mill equipped with four grinding pots each of which had an internal capacity of 4 l and contained 9 kg of steel balls having a diameter of 12 mm. In a nitrogen atmosphere, each of the pots was filled with 300 g of magnesium chloride, 60 ml of tetraethoxysilane and 45 ml of α,α,α-trichlorotoluene, followed by their grinding for 40 hours. Three kilograms of the resulting ground mixture and 20 l of titanium trichloride were added to an autoclave having an internal capacity of 50 l, in which they were thereafter mixed at 80° C. for 2 hours. The supernatant was removed by decantation, followed by an addition of 35 l of n-heptane. The resulting mixture was agitated at 80° C. for 15 minutes, followed by removal of the supernatant by decantation. This washing procedure was repeated 7 times. Thereafter, 20 l of n-heptane was added further to form a slurry of a solid catalyst. A portion of the slurry of the solid catalyst was sampled out and n-heptane was caused to evaporate. An analysis of the residue indicated that the solid catalyst contained 1.4 wt. % of Ti.

(ii) Polymerization

Figure 5:
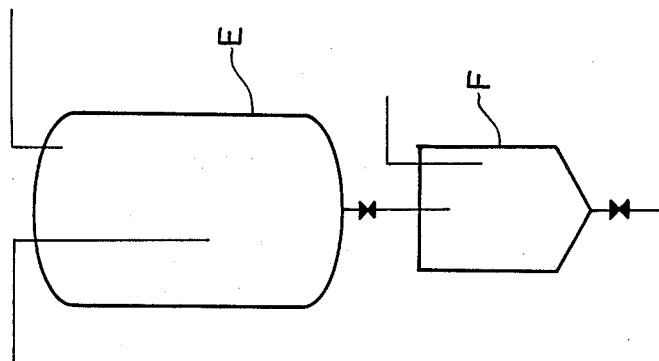
Figure 5:
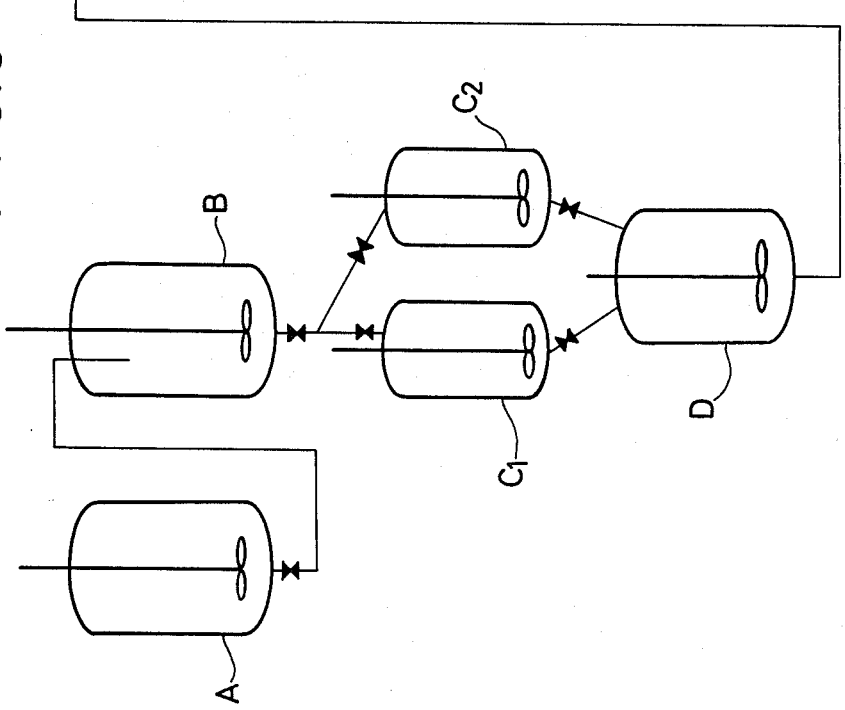

Polymerization was conducted by using the polymerization apparatus shown in FIG. 5. In an autoclave which had been dried sufficiently and purged with nitrogen and had an internal capacity of 50 l, were charged 30 l of n-heptane, 50 g of the above-prepared solid catalyst, 240 ml of diethylaluminum chloride and 140 ml of methyl p-toluylate. The contents were stirred at 25° C. The resultant mixture was called a catalyst slurry mixture. Autoclaves A,B, which had been fully dried and purged at first with nitrogen and then with propylene gas and had an internal capacity of 300 l, were connected in series. Furthermore, autoclaves $C_1,C_2$ having an internal capacity of 200 l were connected in series to the autoclave B but in parallel to each other. A further autoclave D having an internal volume of 300 l was then connected in series relative to the autoclave $C_1,C_2$. Sixty kilograms of propylene were charged into the autoclaves A,B each. The above-prepared catalyst slurry mixture, triethylaluminum and liquid propylene were charged at flow velocities of 1 g/hr in terms of the solid catalyst, 1.5 ml/hr and 30 kg/hr respectively into the autoclave A. While continuously charging triethylaluminum at a flow velocity of 3.0 ml/hr and a polypropylene slurry at a flow velocity of 30 kg/hr from the autoclave A into the autoclave B and at the same time, continuously drawing a polypropylene slurry at a flow velocity of 30 kg/hr from the autoclave B, polymerization was conducted at 75° C. by charging hydrogen at a flow velocity sufficient to maintain the concentrations of hydrogen in the vapor phases in the autoclaves A,B at 6.5 vol % each. When the polymerization was stabilized 6 hours after the beginning of the polymerization, a small amount of a slurry was sampled out from the autoclave B. After converting the slurry to powder, its physical properties were measured. The slurry, which was being continuously drawn out through a lower part of the autoclave B, and methyl p-toluylate, which was fed at a flow velocity of 1.4 ml/30 min, were then charged simultaneously into the autoclave $C_1$, whereby the slurry was introduced for 30 minutes in the autoclave $C_1$. Thereafter, the slurry and methyl p-toluylate from the autoclave B were charged into the autoclave $C_2$. Upon introduction of the slurry into the autoclave $C_1$, 5 kg of liquid propylene was simultaneously charged under pressure into the autoclave $C_1$ while purging its vapor phase, and the internal temperature of the autoclave $C_1$ was changed to 50° C. and at the same time, the concentration of hydrogen in the autoclave $C_1$ was adjusted to 0.3 vol. %. During this period, the activity dropped to about 1/5 due to the introduction of methyl p-toluylate.

During the polymerization, the concentration of the slurry which was calculated from the amount of propylene charged in the autoclaves A,B and the the amount of the resulting polymer determined from the quantity of generated heat calculated from the quantity of heat removed from the autoclaves A,B was continuously determined so as to transfer the slurry in a constant amount. In addition, ethylene and hydrogen were charged to adjust the hydrogen and ethylene concentrations in the vapor phase to 0.55 vol. % and 35.0 mole % respectively. Further, triethylaluminum was introduced under pressure in an average amount of 3.0 ml at once so as to increase the activity (relative value) by about 2.5 times. Their polymerization was effected for 9 minutes at 50° C. while maintaining the above hydrogen and ethylene concentrations. Ethylene was then added further and their polymerization was conducted for 20 minutes at a hydrogen concentration of 0.50 vol. % and an ethylene concentration of 40.0 mole %. After charging 2 ml of methyl p-toluylate, the polymerization mixture was fed under pressure in the course of 7 minutes to the autoclave D which had been filled beforehand with 10 kg of liquid propylene and 50 ml of isopropanol. The interior of the autoclave $C_1$ was washed with liquid propylene and the washing of liquid propylene was also fed to the autoclave D. The autoclave $C_1$ was hence rendered ready for reception of the next slurry at about 3 kg/cm²G. On the other hand, while charging isopropanol at 1 ml/hr into the autoclave D, a slurry was transferred from a lower part of the autoclave D to a flash tank E. Through a hopper F, the slurry was then obtained as powder. Its discharge from the autoclave D was effected continuously at about 40 kg/hr so that about 10 kg of the slurry was left over in the autoclave D when the next supply of the slurry was received from the autoclave $C_2$. In the autoclave $C_2$, copolymerization was conducted in the same manner as in the autoclave $C_1$ after receiving the slurry and methyl toluylate for 30 minutes from the autoclave B.

The above reactions in the autoclaves $C_1,C_2$ were conducted in the following manner. The amounts of polymers polymerized in the autoclaves $C_1,C_2$ were determined from the quantities of generate heat calculated on the basis of the quantities of heat removed from the autoclaves $C_1,C_2$ respectively. The polymerization reactions in the autoclaves $C_1,C_2$ were effected while varying the amounts of triethylaluminum, which were to be charged into the autoclaves $C_1,C_2$, in accordance with the above-mentioned concentrations of their corresponding slurries so that the amounts of the resulting polymers became 13.6% based on the polypropylene transferred as the slurries thereto. The block copolymer of propylene was sampled once an hour so that variations in Izod impact strength at 20° C. were observed. In the above-described manner, the relation between the amount of added triethylaluminum and the activity (see, FIG. 6) was determined each time and the amount of triethylaluminum to be added to the next batchwise polymerization was corrected.

COMPARATIVE EXAMPLE 1

Polymerization was conducted under the same conditions as in Example 1 except that the amounts of triethylaluminum charged in the autoclaves $C_1,C_2$ were not varied.

Results are diagrammatically shown in FIG. 1. In Comparative Example 1 (indicated by "B" in the drawing), the Izod impact strength varied. However, the Izod impact strength remained substantially constant in Example 1 (indicated by "A" in the drawing).

EXAMPLES 2

(i) Synthesis of catalyst components

There was provided an oscillating mill equipped with two grinding pots each of which had an internal capacity of 1 l and contained 2.2 kg of steel balls having a diameter of 12 mm. In a nitrogen atmosphere, each of the pots was filled with 20 g of magnesium chloride, 4 ml of tetraethoxysilane and 3 ml of $\alpha,\alpha,\alpha$-trichlorotoluene, followed by their grinding for 40 hours. Similar procedure was repeated 10 times to obtain 20 batches of a co-ground mixture in total. The thus-obtained co-ground mixture of the batches (about 25 g per batch) were separately placed in 1-l round bottom flasks. After mixing the co-ground mixture of each batch with 300 ml of titanium tetrachloride at 80° C. for 2 hours, the resultant mixture was left over and the supernatant was removed. Then, 500 ml of n-heptane was added, followed by stirring of the resultant mixture at 30° C. for 5 minutes. The mixture was allowed to stand for its separation and the supernatant was removed. This washing procedure was repeated 7 times, followed by a further addition of 500 ml of n-heptane to obtain a slurry of a solid catalyst.

(ii) Polymerization

By using the polymerization apparatus shown in FIG. 5, polymerization was conducted in the same manner as in Example 1.

In the autoclave which had been fully dried and purged with nitrogen and had the internal capacity of 50 l, were charged 12 l of n-heptane, 20 g of the above-prepared solid catalyst, 96 ml of diethylaluminum chloride and 56 ml of methyl p-toluylate. The contents were stirred at 25° C. The above procedure was conducted separately for each of the above-mentioned catalyst lots. After stabilization of the polymerization by the below-described procedure, the polymerization was carried out by changing the catalyst with a fresh supply of the catalyst at every 5th hour. The polymerization mixture will hereinafter be called "catalyst slurry mixture". The autoclaves A,B, which had been fully dried and purged at first with nitrogen and then with propylene gas and had an internal volume of 300 l, were connected in series. Furthermore, the autoclaves $C_1,C_2$ having an internal capacity of 200 l were connected in series to the autoclave B but in parallel to each other. The further autoclave D having the internal capacity of 300 l was then connected in series relative to the autoclave $C_1,C_2$. Sixty kilograms of propylene were charged into the autoclaves A,B each. The above-prepared catalyst slurry mixture, triethylaluminum and liquid propylene were charged at flow velocities of 1 g/hr in terms of the solid catalyst, 1.5 ml/hr and 30 kg/hr respectively into the autoclave A. While continuously charging triethylaluminum at a flow velocity of 3.0 ml/hr and a polypropylene slurry at a flow velocity of 30 kg/hr from the autoclave A into the autoclave B and at the same time, continuously drawing a polypropylene slurry at a flow velocity of 30 kg/hr from the autoclave B, polymerization was conducted at 75° C. by charging hydrogen at a flow velocity sufficient to maintain the concentrations of hydrogen in the vapor phases in the autoclaves A,B at 6.5 vol % each. When the polymerization was stabilized 6 hours after the beginning of the polymerization, a small amount of a slurry was sampled out from the autoclave B. After converting the slurry to powder, its physical properties were measured. The continuous polymerization in the autoclaves A,B was conducted to control the concentration of the slurry of the resulting polypropylene constant at 40 wt. % by varying the amount of propylene to be charged into the autoclaves A,B in accordance with the amount of the resultant polypropylene calculated from the quantity of generated heat. The slurry, which was being continuously drawn out through the lower part of the autoclave B, and methyl p-toluylate, which was fed at a flow velocity of 0.8 ml/30 min, were then charged simultaneously into the autoclave $C_1$, whereby the activity was changed to about 2/5. After receiving the slurry for 30 minutes in the autoclave $C_1$, the destination of the slurry and methyl p-toluylate from the autoclave B was changed to the autoclave $C_2$. Upon introduction of the slurry into the autoclave $C_1$, 5 kg of liquid propylene was simultaneously charged under pressure into the autoclave $C_1$ while purging its vapor phase, and the internal temperature of the autoclave $C_1$ was changed to 50° C. and at the same time, the concentration of hydrogen in the autoclave $C_1$ was adjusted to 0.3 vol. %. Furthermore, ethylene and hydrogen were charged to adjust the hydrogen and ethylene concentrations to 0.60 vol. % and 35.0 mole % respectively in the vapor phase. They were then polymerized at 50° C. for 12 minutes. Ethylene was added further and the polymerization was conducted for 2.5 minutes at a hydrogen concentration of 0.55 vol. % and an ethylene concentration of 40.0 mole %. After charging 20 ml of methyl p-toluylate and reducing the activity to about ⅓, the resulting slurry was delivered under pressure in the course of 7 minutes to the autoclave D which had in advance been filled with 10 kg of liquid propylene and 50 ml of isopropanol. The interior of the autoclave $C_1$ was washed with liquid propylene and the washing of liquid propylene was also fed to the autoclave D. The autoclave $C_1$ was hence rendered ready for reception of the next slurry at about 3 kg/cm²G. On the other hand, while charging isopropanol at 1 ml/hr into the autoclave D, a slurry was transferred from the lower part of the autoclave D to the flash tank E. Through the hopper F, the slurry was then obtained as powder. Its discharge from the autoclave D was effected continuously at about 40 kg/hr so that about 10 kg of the slurry was left over in the autoclave D when the next supply of the slurry was received from the autoclave $C_2$. In the autoclave $C_2$, copolymerization was conducted in the same manner as in the autoclave $C_1$ after receiving the slurry and methyl toluylate for 30 minutes from the autoclave B. The reaction in each of the autoclaves $C_1,C_2$ was conducted in the following manner. Namely, the polymerization in the batchwise polymerization system was conducted for a period of from the 1st hour up to the 20th hours by changing the period in accordance with the amount of the introduced slurry so as to charge ethylene to a predetermined amount (i.e., to an amount required to maintain the pressure constant). For a period ranging from the 21st hours to the 30th hours, the polymerization was conducted by changing the amount of triethylaluminum to be charged. Results are summarized in Table 1.

COMPARATIVE EXAMPLE 2

Polymerization was conducted for 30 hours under the same conditions as in Example 2 except that the amount of triethylaluminum charged into the polymerization tank for the batchwise polymerization and the polymerization time of the batchwise polymerization were not varied at all. The resulting block copolymer was sampled out at every 10th hour, followed by measurement of its physical properties. Results are shown in Table 1. Although the ethylene content of each block copolymer of Comparative Example 2 is not significantly different from that of the corresponding block copolymer of Example 2, the stiffness and impact resistance of the former block copolymer are apparently inferior to those of the latter block copolymer.

TABLE 1

| Example | M ± g/10 min | Ethylene content (%) | Flexural rigidity (kg/cm$^2$) | Du Pont impact strength kg·cm 20° C. | Du Pont impact strength kg·cm −10° C. | Izod impact strength kg·cm/cm 20° C. | Izod impact strength kg·cm/cm −10° C. |
|---|---|---|---|---|---|---|---|
| Ex. 2 1-10 hrs | 7.3 | 9.6 | 11900 | 85 | 49 | 8.5 | 4.5 |
| Ex. 2 11-20 hrs | 7.3 | 9.7 | 11900 | 86 | 50 | 8.6 | 4.5 |
| Ex. 2 21-30 hrs | 7.3 | 9.6 | 11900 | 85 | 50 | 8.5 | 4.6 |
| Comp. Ex. 2 1-10 hrs | 7.5 | 9.2 | 11800 | 68 | 40 | 7.4 | 3.8 |
| Comp. Ex. 2 11-20 hrs | 7.6 | 10.0 | 11000 | 75 | 43 | 8.1 | 4.0 |
| Comp. Ex. 2 21-30 hrs | 7.3 | 9.4 | 11200 | 67 | 41 | 7.3 | 3.8 |

EXAMPLE 3

The polymerization reaction conducted in Example 1 was carried out by changing the reaction time in each stage in the batchwise polymerization system so as to control the batchwise polymerization system (the reactions in the autoclaves $C_1, C_2$) at desired values. The first stage in the batchwise polymerization system was controlled in the following manner. Pressures, temperatures and hydrogen concentrations were input in a computer and an operation was performed in accordance with the above-described flow chart. After variations of the amount(s) of charged ethylene and/or propylene and the cumulative value of the amount of the resultant block copolymer, which were determined by differences between the reacted ethylene/propylene weight ratio and the amount of the resultant block copolymer and their corresponding predetermined values, became equal to their corresponding desired values as outputs, the computer was then used to control the second stage of the batchwise polymerization. After the amount of the copolymer polymerized in the second stage reached a desired value, the batchwise polymerization was finished. The input of pressure and temperature was effected once every 10th second.

The resulting block copolymer was sampled at an interval of 5 hours and its physical properties were measured. Results are given below.

| | |
|---|---|
| Ethylene content: | 8.1 ± 0.2 |
| Flexural rigidity: | 12500 ± 500 |
| Du Pont impact strength (20° C.) | 82 ± 2 |
| Du Pont impact strength (−10° C.) | 48 ± 2 |
| Izod impact strength (20° C.) | 9.0 ± 0.2 |
| Izod impact strength (−10° C.) | 4.2 ± 0.2 |

The thus-obtained block copolymer had extremely stable quality as shown above.

EXAMPLE 4

The polymerization reaction conducted in Example 1 was carried out by changing the reaction time in each stage in the batchwise polymerization system so as to control the batchwise polymerization system (the reactions in the autoclaves $C_1, C_2$) at desired values. The first stage in the batchwise polymerization system was controlled in the following manner. Pressures and temperatures were input in a computer and an operation was performed in accordance with the above-described flow chart. After variations of the amount(s) of charged ethylene and/or propylene and the cumulative value of the amount of the resultant block copolymer, which were determined by differences between the reacted ethylene/propylene weight ratio and the amount of the resultant block copolymer and their corresponding predetermined values, became equal to their corresponding desired values as outputs, the computer was then used to control the second stage of the batchwise polymerization. After the amount of the copolymer polymerized in the second stage reached a desired value, the batchwise polymerization was finished. The input of pressure and temperature was effected once every 10th second. The material balance was determined every hour. The polymerization was conducted by correcting the amount of the resulting copolymer in accordance with the material balance so as to control the ethylene content at 8.1. The resulting block copolymer was sampled at an interval of 5 hours and its physical properties were measured. Results are given below.

| | |
|---|---|
| Ethylene content: | 8.1 ± 0.1 |
| Flexural rigidity: | 12500 ± 200 |
| Du Pont impact strength (20° C.) | 82 ± 2 |
| Du Pont impact strength (−10° C.) | 48 ± 2 |
| Izod impact strength (20° C.) | 9.0 ± 0.1 |
| Izod impact strength (−10° C.) | 4.2 ± 0.1 |

The thus-obtained block copolymer had extremely stable quality as shown above.

What is claimed is:

1. In a process for the production of a block copolymer of propylene by using propylene itself as a liquid medium, conducting a first-stage continuous polymerization of propylene alone or propylene and a small amount of ethylene, and then conducting a second stage batchwise copolymerization of ethylene and propylene, the improvement wherein the amount of an organometallic compound to be added to a polymerization tank for the second-stage polymerization and/or the polymerization time of the second-stage polymerization are controlled in accordance with the amount of a slurry transferred from a polymerization tank for the first-stage polymerization to the polymerization tank for the second-stage polymerization so as to maintain the ratio of the amount of the polymer polymerized by the first-stage polymerization to the amount of the polymer polymerized by the second-stage polymerization constant in the block copolymer.

2. The process as claimed in claim 1, wherein the amount of the organometallic compound to be added to the polymerization tank for the second-stage polymerization and/or the polymerization time of the second-stage polymerization are controlled so as to maintain the amount of the polymer polymerized by the second-stage polymerization as calculated from the quantity of heat generated in the polymerization tank for the second-stage polymerization at a ratio constant to the amount of the polymer transferred into the polymerization tank for the second-stage polymerization.

3. The process as claimed in claim 1, wherein the temperature and pressure in the polymerization tank for the second-stage polymerization are detected, and the amount of the organometallic compound to be added to the polymerization tank for the second-stage polymerization and/or the polymerization time of the second-stage polymerization are controlled so as to maintain, at desired values, the reacted ethylene/propylene weight ratio in the resultant copolymer and the amount of the resultant copolymer, which are calculated in accordance with a pre-determined equation showing the relation among reacted ethylene/propylene weight ratio, polymerization temperature and reaction velocity.

4. The process as claimed in claim 1, wherein the weight ratio of ethylene to propylene reacted in the second-stage polymerization and the amount of the polymer polymerized by the second-stage polymerization are control by the amounts of ethylene and/or propylene to be charged, their reaction time and the amount of the organometallic compound to be added.

5. The process as claimed in claim 1, wherein the first-stage polymerization is conducted in such a manner that the concentration of the slurry remains constant.

6. The process as claimed in claim 1, wherein the values to which the amount of the organometallic compound to be added to the polymerization tank for the second-stage polymerization and/or polymerization time of the second-stage polymerization are controlled are modified in accordance with the content of ethylene in the block copolymer calculated on the basis of the material balance in the polymerization system.

* * * * *

UNITED STATES PATENT AND TRADEMARK OFFICE
CERTIFICATE OF CORRECTION

PATENT NO. : 4,772,661

DATED : Sep. 20, 1988

INVENTOR(S) : Tadashi ASANUMA et al.

It is certified that error appears in the above-identified patent and that said Letters Patent is hereby corrected as shown below:

On the Title Page, Item [75]:

Please delete the following three names; they have erroneously been listed as co-inventors:

Mitsuru Ito
    Kaneo Ito
    Shigeru Kimura

Signed and Sealed this

Thirteenth Day of June, 1989

*Attest:*

DONALD J. QUIGG

*Attesting Officer*    *Commissioner of Patents and Trademarks*